US008372180B2

(12) United States Patent
Akkerman et al.

(10) Patent No.: US 8,372,180 B2
(45) Date of Patent: Feb. 12, 2013

(54) PROCESS FOR CONTROLLING THE MOISTURE CONTENT OF A SUPPLY GAS FOR USE IN DRYING A PRODUCT

(75) Inventors: Jan Coen Akkerman, Wageningen (NL); Moniek Afra Boon, Apeldoorn (NL); Paulus Josephus Theodorus Bussmann, Apeldoorn (NL)

(73) Assignee: Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 718 days.

(21) Appl. No.: 12/445,018

(22) PCT Filed: Oct. 12, 2007

(86) PCT No.: PCT/NL2007/050495

§ 371 (c)(1), (2), (4) Date: Aug. 20, 2009

(87) PCT Pub. No.: WO2008/044932

PCT Pub. Date: Apr. 17, 2008

(65) Prior Publication Data

US 2010/0031528 A1 Feb. 11, 2010

(30) Foreign Application Priority Data

Oct. 12, 2006 (EP) .................................... 06076879

(51) Int. Cl.
*B01D 53/06* (2006.01)
*B01D 53/26* (2006.01)

(52) U.S. Cl. ............................................. 95/10; 95/107

(58) Field of Classification Search .................... 96/109, 96/111, 112, 125–128, 145; 95/10, 13, 14, 95/107, 117, 148; 34/472, 474; 62/271, 62/94

See application file for complete search history.

(56) References Cited

U.S. PATENT DOCUMENTS 2,957,321 A 10/1960 Munters et al.
2,993,563 A 7/1961 Munters et al.
(Continued)

FOREIGN PATENT DOCUMENTS

CN 2089139 U1 11/1991
DE 9318260 U1 2/1994
(Continued)

OTHER PUBLICATIONS

Machine generated English translation of JP 07-293972, published Nov. 1995.*

*Primary Examiner* — Frank Lawrence, Jr.
(74) *Attorney, Agent, or Firm* — Lucas & Mercanti, LLP

(57) ABSTRACT

The invention provides a process for controlling the moisture content of a supply gas for use in drying a product, which process comprises the steps of: (a) providing the supply gas; (b) optionally heating the supply gas; (c) determining the temperature and the moisture content of the supply gas; (d) contacting the supply gas with a rotating desiccant wheel, whereby the rotating speed of the desiccant wheel is controlled by means of the data on the temperature and the moisture content as obtained in step (c) in combination with the corresponding sorption isotherm of the desiccant; and (e) recovering the dehumidified supply gas as obtained in step (d). The invention further provides a dehumidified gas obtainable by said process, a dehumidifier system, a process for drying a product comprising bringing the product into contact with a dehumidified gas as obtained in accordance with the invention, and a product obtainable by said drying process.

16 Claims, 1 Drawing Sheet

U.S. PATENT DOCUMENTS

| | | | | |
|---|---|---|---|---|
| 3,183,649 | A | 5/1965 | Teller | |
| 4,365,979 | A | 12/1982 | Takeyama et al. | |
| 4,887,438 | A | 12/1989 | Meckler | |
| 4,926,618 | A * | 5/1990 | Ratliff | 95/10 |
| 5,659,974 | A | 8/1997 | Graeff | |
| 5,688,305 | A | 11/1997 | Graeff | |
| 6,083,304 | A | 7/2000 | Fujimura | |
| 6,751,964 | B2 * | 6/2004 | Fischer | 62/94 |
| 7,685,834 | B2 * | 3/2010 | Moffitt | 62/271 |
| 2005/0204914 | A1 | 9/2005 | Boutall | |
| 2005/0235827 | A1 | 10/2005 | Dinnage et al. | |
| 2005/0262862 | A1 | 12/2005 | Moffitt | |
| 2006/0278364 | A1 | 12/2006 | Struensee | |

FOREIGN PATENT DOCUMENTS

| | | | |
|---|---|---|---|
| JP | 05200231 | A | 8/1993 |
| JP | 07293972 | A | 11/1995 |

* cited by examiner

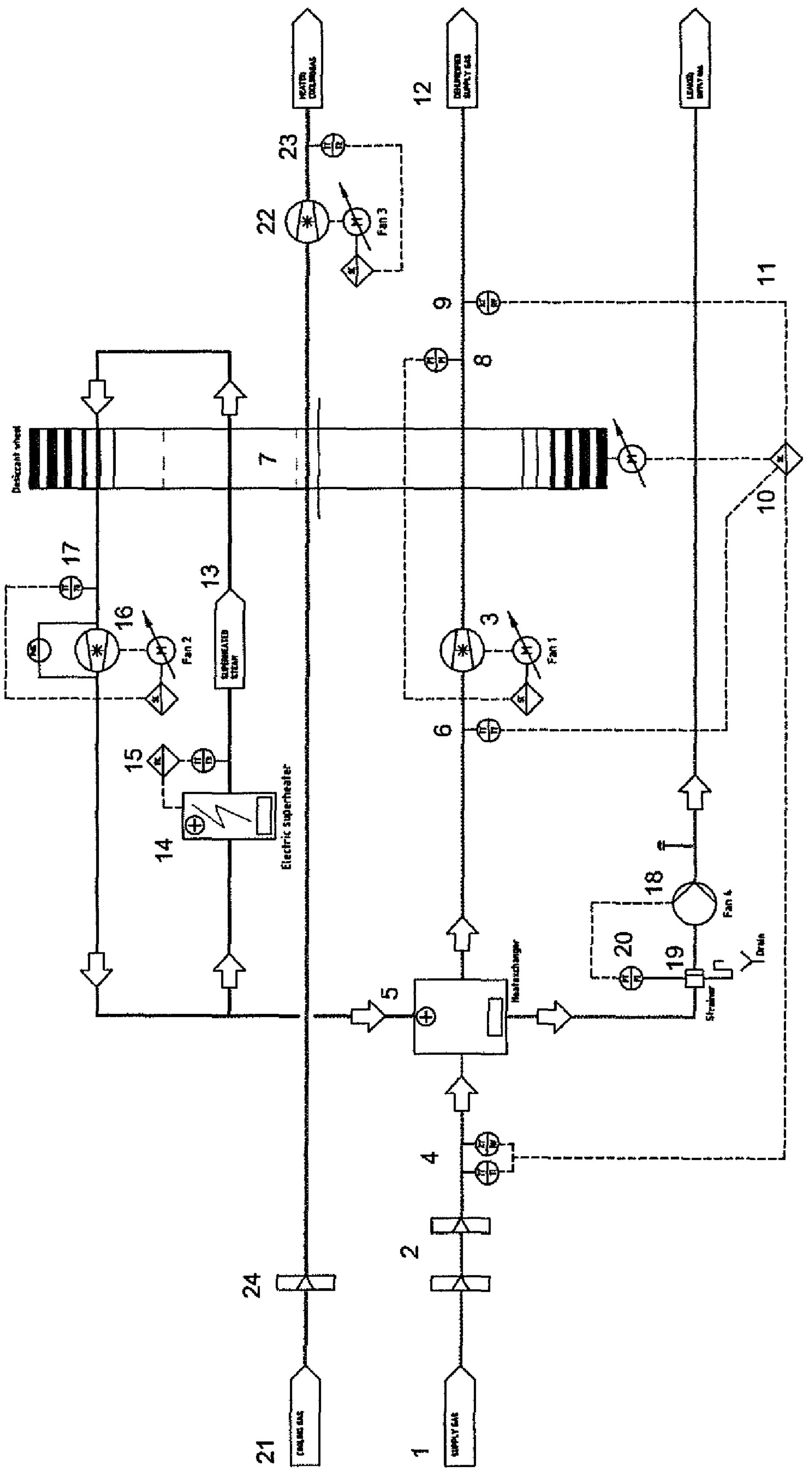
1
2
3
4
5
6
7
8
9
10
11
12
13
14
15
16
17
18
19
20
21
22
23
24
Desiccant wheel
Electric superheater
Heatexchanger
Strainer
Drain
Fan 1
Fan 2
Fan 3
Fan 4

PROCESS FOR CONTROLLING THE MOISTURE CONTENT OF A SUPPLY GAS FOR USE IN DRYING A PRODUCT

The present invention relates to a process for controlling the moisture content of a supply gas for use in drying a product, a dehumidifier system, a dehumidified gas obtainable by said process, a process for drying a product, and a dried product obtainable by said drying process.

Drying is one of the most common preservation processes for food products and chemicals. A wide range of machines has been developed to suit the different products to be dried. In most cases, the heat to evaporate the moisture is supplied by means of hot air, which has the advantage that the product is heated to the so-called wet bulb temperature, which is much lower than the air temperature. In this manner heat sensitive products can be dried without loss of quality. The use of fresh hot air has, however, the drawbacks that the moisture content of the air is variable, and that the air contains oxygen.

With respect to the variable moisture content of the air, it is observed that the moisture content of air in the outlet of a dryer is limited by the water activity of the dried product. Hence, if the water content of the inlet air is high, little water can be taken from the product per kg of inlet air. Moreover, in case of variable weather conditions, the rapid variations of the water content of the inlet air are taken into account by using large margins in the process settings. These margins are based on the maximum moisture content during the year. In practice this leads to drying the product to a lower water activity than required, which in turn leads to loss of yield, loss of quality aspects like bulk density and decrease in drying capacity.

As regards the oxygen content in the air, it is noted that the intensive mixing of oxygen with the product induces fire and explosion hazards, and in some cases also the degradation of products due to oxidation.

By subjecting the inlet air to a pre-drying step, the variation in moisture content can be reduced. For this purpose use is typically made of dew-point coolers, and desiccant dryers based on silicagel or zeolite. As regards the use of desiccant dryers reference can, for instance, be made to US 2005/0050906. Dew-point coolers require, however, considerable amounts of electrical power, use of cooling liquids and induce also microbial risk of growth of the wet surface of the heat exchanger, whereas the high energy consumption of the regeneration of the desiccant used is an important drawback. Moreover, the standard desiccant systems are not controlled with respect to the final moisture content of the treated air. In this respect it is observed that the desiccant dampens the variation in moisture content to some extent, but the problem with respect to product yield and quality remains.

It is the object of the present invention to deal with the above problems.

Surprisingly, it has now been found that the above problems can be dealt with when use is made in a particular manner of zeolite desiccant rotors.

Accordingly, the present invention relates to a process for controlling the moisture content of a supply gas for use in drying a product, which process comprises the steps of:

(a) providing the supply gas;

(b) optionally heating the supply gas;

(c) determining the temperature and the moisture content of the supply gas;

(d) contacting the supply gas with a rotating desiccant wheel, whereby the rotating speed of the desiccant wheel is controlled by means of the data on the temperature and the moisture content as obtained in step (c) in combination with the corresponding sorption isotherm of the desiccant; and (e) recovering the dehumidified supply gas as obtained in step (d).

In a preferred embodiment of the present invention, in step (d) the supply gas is passed through a rotating zeolite desiccant wheel which comprises at least an adsorption section through which the supply gas passes and wherein moisture is adsorbed from the supply gas, a regeneration section through which superheated steam is passed to remove at least part of the adsorbed moisture from the zeolite desiccant whereby steam is obtained that comprises at least part of the moisture that was adsorbed in the adsorption section, and a flush section through which a flush gas is passed to cool the zeolite desiccant and wherein further regeneration of the zeolite takes place.

The process in accordance with the present invention, in which the rotating speed of the desiccant wheel is controlled by means of the data on the temperature and the moisture content as obtained in step (c) in combination with the corresponding sorption isotherm of the desiccant, allows for the maximum amount of moisture to be adsorbed by the desiccant, which is highly advantageous from energy perspective in the regeneration step.

Suitably, the flush gas used to cool the zeolite desiccant is passed through the desiccant wheel to preheat the wheel prior to passing the superheated steam through the regeneration section.

Suitably, excess superheated steam is recovered from the steam that comprises at least part of the moisture that was adsorbed in the adsorption section, which excess superheated steam is used for energy purposes, and at least part of the remaining superheated steam is passed to the regeneration section.

Suitably, the remaining superheated steam which is passed to the regeneration steam will pass through a heater before entering the regeneration section to maintain the temperature of the superheated steam at the required level. Preferably, the flow of the superheated steam will be sufficient to allow for a stable operation of the heater. Preferably, at least part of the superheated steam from the heater will by-pass the desiccant wheel and will be at least partly be recycled to the heater.

In accordance with the present invention the high energy consumption of the zeolite regeneration can be reduced by the use of closed loop superheated steam as regenerative medium. The superheated steam desorbs the water adhered to the zeolite, yielding a saturated or slightly unsaturated steam, which may be applied to heat the inlet drying air. The latent heat of condensation is captured, yielding a significant reduction of the energy consumption of the dryer as a whole. The alternating use of air and superheated steam for respectively adsorption and regeneration leads inevitable to mixing of the two gasses at the borders between the sections. In order to prevent humidification of the drying air several precautions have to be taken. A special flush section in the desiccant rotor is introduced to remove superheated steam in the voids of the rotor at the interface from regeneration section to the adsorptive section. In this flush section a rapid drop in vapour pressure causes additional release of adsorbed water and cooling of the hot desiccant. Other steps taken are special seals between the sections in order to minimize leakages from one section to the next and the introduction of a proper pressure balance. As the flow of gas is always from high to low pressure, the pressure balance has been set up to secure the prevention of the leakage of any moisture in the dried air or deterioration of the regeneration of the zeolite.

Accordingly, in the process according to the present invention preferably a pressure balance is maintained which prevents leakage of moisture from the regeneration section or the flush section into the adsorption section, whereby the following conditions with respect to pressures are met in adjacent sections:

(i) the pressure of the supply gas on the front side of the adsorption section is higher than the pressure of the flush gas on the front side of the flush section;
(ii) the pressure of the supply gas on the front side of the adsorption section is higher than the pressure of the superheated steam on the front side of the regeneration section;
(iii) the pressure of the flush gas on the front side of the flush section is higher than the pressure of the superheated steam on the front side of the regeneration section;
(iv) the pressure of the supply gas on the back side of the adsorption section is higher than the pressure of the flush gas on the back side of the flush section; and
(v) the pressure of the supply gas on the back side of the adsorption section is higher than the pressure of the superheated steam on the back side of the regeneration section.

Another impart aspect of the system is the real-time control of the moisture content of the air. By measuring the temperature and moisture content of the air before entrance in the desiccant rotor and combining this with the sorption isotherm of the zeolite, the rotor speed can be adjusted in order to obtain a constant moisture content in the air to the product dryer.

The zeolite desiccant can also be used to dry and regenerate the outlet air of a dryer. In this manner a closed loop dryer can be achieved. In this way the loss of heat of condensation can be prevented, leading to a tremendous energy saving. Moreover, the reuse of the drying gas allows also the use of other gasses than air as a drying medium. Whereas in once-through systems the use of other drying media than air is not economically feasible, in a closed cycle it can be a realistic option.

In the process according to the invention, the supply gas is heated in step (b). Suitably, the supply gas is heated in step (b) to a temperature in the range of from 5 to 60° C., preferably in the range of from 30 to 50° C.

Preferably, the steam that comprises at least part of the moisture that was adsorbed in the adsorption section is subsequently condensed and the heat generated during the condensation of said steam is used to heat the supply gas in step (b).

Suitably, at least part of the supply gas present in the superheated steam to be condensated is removed from the superheated steam during the condensation.

The steam that comprises at least part of the moisture that was adsorbed in the adsorption section has preferably a temperature in the range of from 110 to 250° C.

In an attractive embodiment of the present invention, the supply gas, the superheated steam and the flush gas are each passed through the segment concerned by means of a ventilator or a compressor.

Preferably, the zeolite contained in the rotating desiccant wheel is of the 3A, 4A and/or 5A type. More preferably, the zeolite contained in the rotating desiccant wheel is of the 4A type.

The regeneration section to be used in accordance with the present invention preferably comprises two or more segments.

In addition, the present invention relates a dehumidified gas obtainable by the present process for controlling the moisture content of a supply gas for use in drying a product. Such a dehumidified gas is unique in terms of adjustable and constant moisture content.

The present invention also relates to a dehumidifier system which comprises a zeolite rotating desiccant wheel which comprising a first means to supply a supply gas to an adsorption section of the desiccant wheel, a second means to supply superheated steam to a regeneration section of the desiccant wheel, and a third means to supply a flush gas to a flush section, whereby each of the first, second and third means comprises a ventilator or compressor.

Preferably, the regeneration section of the dehumidifier system in accordance with the present invention comprises two or more segments.

The present invention further relates to a process for drying a product comprising bringing the product into contact with a dehumidified gas as obtained in the process for controlling the moisture content of a supply gas for use in drying product in accordance with the present invention.

Preferably, the product to be dried is a food product.

Preferably, in such a drying process use is made of the dehumidifier system in accordance with the present invention.

In the present process for drying the product (preferably a food product), the dehumidified gas to be used to dry the product is preferably applied in a closed loop embodiment, i.e. that after use the dehumidified gas which now contains a higher amount of moisture is subjected to the process of the present invention.

Preferably, in accordance with the present invention, the supply gas is nitrogen or carbon dioxide or any other gas.

Preferably, the flush gas is the same gas as the supply gas.

The present invention also relates to a product obtainable by the process for drying a product in accordance with the present invention. Such a product is unique in terms of quality, due to the improved process control, which results of the elimination of process variables like the moisture content of the inlet gas, and the option to use other gasses than air.

BRIEF DESCRIPTION OF THE DRAWINGS

The various aspects of the present invention will now been discussed on the basis of FIG. 1, which Figure serves to illustrate the present invention without limiting it to a particular embodiment.

FIG. 1 is a schematic diagram illustrating the process and system components of one embodiment that includes a rotating desiccant wheel.

In F*igure* 1, the supply gas (1) is sucked through a double filter section (2) by means of a fan (3) (fan 1). The moisture content of the air is monitored by means of a relative humidity and temperature sensor (4). The air is heated in a heat exchanger (5). The air temperature is monitored by a temperature transmitter (6) and the air passes through the rotating zeolite desiccant wheel (7), where its moisture is adsorbed by the zeolite. The pressure transmitter P1 (8) assures a constant flow by the fan (3). A special transmitter (9) measures the moisture content of the supply gas. The rotor speed of the rotating zeolite desiccant wheel (7) is constantly adjusted by means of a feed forward control loop (10) on the basis of the moisture content of the supply gas and the temperature in front of the heat exchanger (5), combined with the sorption isotherm of the zeolite. Minor adjustments in the rotor speed can be made, using a back feed control loop (11) based on the moisture content measurement of the dehumidified supply gas (12).

Subsequently, the zeolite is regenerated by means of superheated steam (13) which is fed in a countercurrent loop. The temperature of the steam derived from the superheater (14) is kept constant by means of a control loop controlled by temperature transmitter (15). The allocation of heat is limited by adjusting the flow of the fan (16) (fan 2) through the desiccant wheel by means of a control loop controlled by means of a temperature transmitter (17). The excess steam, due to the released moisture from the zeolite is condensed in the heat exchanger (5). The small amount of leaked supply gas in the steam is removed by means of the fan (18) (fan 4). A strainer (19) separates the condensate and the gas. The pressure in the strainer is controlled by a control loop controlled by means of a pressure transmitter (20). The hot regenerated zeolite in the desiccant wheel is cooled down by means of a flush gas (21). The flow of flush gas is maintained by a fan (22) (fan 3), which is controlled by means of the temperature transmitter (23) (T2) of the zeolite desiccant wheel. The cooling gas is filtered by filter (24) prior to passage through the desiccant wheel.

The invention claimed is:

1. A process for controlling the moisture content of a supply gas for use in drying a product, which process comprises the steps of:

(a) providing the supply gas;

(b) optionally heating the supply gas;

(c) determining the temperature and the moisture content of the supply gas;

(d) passing the supply gas through a rotating zeolite desiccant wheel which comprises at least an adsorption section through which the supply gas passes and wherein moisture is adsorbed from the supply gas, a regeneration section through which superheated steam is passed to remove at least part of the adsorbed moisture from the zeolite desiccant whereby steam is obtained that comprises at least part of the moisture that was adsorbed in the adsorption section, and a flush section through which a flush gas is passed to cool the zeolite desiccant and wherein further regeneration of the zeolite takes place, whereby the rotating speed of the zeolite desiccant wheel is adjusted by a feed forward control loop on the basis of the moisture content as obtained in step (c) and the corresponding sorption isotherm of the zeolite desiccant; and (e) recovering the dehumidified supply gas as obtained in step (d).

2. A process according to claim 1, wherein the flush has used to cool the zeolite desiccant is passed through the desiccant wheel to preheat the wheel prior to passing the superheated steam through the regeneration section.

3. A process according to claim 1, wherein excess superheated steam is recovered from the steam that comprises at least part of the moisture that was adsorbed in the adsorption section, which excess superheated steam is used for energy purposes, and at least part of the remaining superheated steam is passed to the regeneration section.

4. A process according to claim 1, wherein a pressure balance is maintained which prevents leakage of moisture from the regeneration section or the flush section into the adsorption section, whereby the following conditions with respect to pressures are met in adjacent sections:

(i) the pressure of the supply gas on the front side of the adsorption section is higher than the pressure of the flush gas on the front side of the flush section;

(ii) the pressure of the supply gas on the front side of the adsorption section is higher than the pressure of the superheated steam on the front side of the regeneration section;

(iii) the pressure of the flush gas on the front side of the flush section is higher than the pressure of the superheated steam on the front side of the regeneration section;

(iv) the pressure of the supply gas on the back side of the adsorption section is higher than the pressure of the flush gas on the back side of the flush section; and (v) the pressure of the supply gas on the back side of the adsorption section is higher than the pressure of the superheated steam on the back side of the regeneration section.

5. A process according to claim 1, wherein the supply gas is heated in step (b).

6. A process according to claim 1, wherein the steam that comprises at least part of the moisture that was adsorbed in the adsorption section is subsequently condensed and the heat generated during the condensation of said steam is used to heat the supply gas in step (b).

7. A process according to claim 6, wherein at least part of the supply gas present in the superheated steam to be condensed is removed from the superheated steam during the condensation.

8. A process according to claim 1, wherein the supply gas, the superheated steam and the flush gas are each passed through the segment concerned by means of a ventilator or a compressor.

9. A process according to claim 1, wherein the zeolite contained in the rotating desiccant wheel is of the 3A, 4A anchor 5A type.

10. A process according to claim 1, wherein the regeneration section comprises two or more segments.

11. A process according to claim 1, wherein the supply gas is heated in step (h) to a temperature in the range of from 30 to 100° C.

12. A process according to claim 1, wherein the steam that comprises at least part of the moisture that was adsorbed in the adsorption section has a temperature in the range of from 90 to 250° C.

13. A process for drying a product comprising dehumidifying a gas according to the process of claim 1, and contacting the product with said dehumidified gas.

14. A process according to claim 13, wherein the product is a food product.

15. A process according to claim 1, wherein the supply gas is nitrogen or carbon dioxide.

16. A process according to claim 1, wherein the flush gas is the same as the supply gas.

* * * * *

UNITED STATES PATENT AND TRADEMARK OFFICE

CERTIFICATE OF CORRECTION

PATENT NO. : 8,372,180 B2
APPLICATION NO. : 12/445018
DATED : February 12, 2013
INVENTOR(S) : Akkerman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 847 days.

Signed and Sealed this
First Day of September, 2015

Michelle K. Lee
*Director of the United States Patent and Trademark Office*